United States Patent

[11] 3,603,597

[72] Inventor Robert Haake
Pasadena, Calif.
[21] Appl. No. 819,299
[22] Filed Apr. 25, 1969
[45] Patented Sept. 7, 1971
[73] Assignee Bell & Howell Company
Chicago, Ill.

[54] TAPE RECORDER
46 Claims, 16 Drawing Figs.

[52] U.S. Cl. 274/4 F, 179/100.2 Z, 242/199
[51] Int. Cl. G11b 5/00
[50] Field of Search 274/4 F; 242/180, 181, 197–200; 352/6, 7, 8, 123; 353/15; 179/100.2 Z

[56] References Cited

UNITED STATES PATENTS

| | | | |
|---|---|---|---|
| 2,568,734 | 9/1951 | Heyer | 352/123 |
| 2,625,073 | 1/1953 | Young | 352/123 |
| 2,670,212 | 2/1954 | Heller | 274/46 |
| 2,908,769 | 10/1959 | Fonda | 274/4 A |
| 2,359,665 | 12/1967 | Gerry | 274/4 F |
| 3,289,962 | 12/1966 | Gellenthin | 274/4 F |
| 3,453,397 | 7/1969 | Miller | 274/4 F |
| 3,477,726 | 11/1969 | Laschenski | 274/4 F |
| 3,484,055 | 12/1969 | Raine | 274/4 F |

*Primary Examiner*—Leonard Forman
*Assistant Examiner*—Dennis A. Dearing
*Attorney*—Hume, Clement, Hume & Lee ABSTRACT: A tape recorder is disclosed for automatically playing a succession of tape cassettes of the type having separately reproducible record tracks. A carrier supports one cassette at the play station for reproduction of a first set of record tracks after which a control is actuated to lift the carrier away from the play station, invert the cassette and return the cassette to the play station for reproduction of the second and last set of record tracks. A storage bin holding a plurality of cassettes in stacked relation is positioned laterally adjacent the play station and the vertical path traversed by the carrier in its operating cycle. On its next operating cycle, the carrier momentarily dwells at positions respectively adjacent the top and bottom of the bin while an injector mechanism transfers the one cassette from the carrier into the bin and an ejector lever transfers a successive cassette from the bin into the carrier to permit play of a successive cassette. The storage bin is preferably removable from the recorder and is constructed so as to serve as a convenient, independent storage vehicle for a series of cassettes. Additional features are disclosed.

Inventor
Robert Haake
By Hume, Clement, Hume & Lee
Attorneys

Inventor
Robert Haake
By Hume, Clement, Hume & Lee
Attorneys

Inventor
Robert Haake
By Hume, Clement, Hume & Lee
Attorneys

Inventor
Robert Haake
By *Hume, Clement, Hume & Lee*
Attorneys

Inventor
Robert Haake
By Hume, Clement, Hume & Lee
Attorneys

Inventor
Robert Haake

By Hume, Clement, Hume & Lee

Attorneys

TAPE RECORDER

INTRODUCTION

The present invention relates generally to tape recorder-reproducers or the like and, more particularly, is directed to apparatus for handling and automatically playing tape cassettes.

SUMMARY OF THE INVENTION

It is a principle object of the present invention to provide new and improved handling and storage apparatus for tape cassettes.

The tape recorder of the present invention senses the end of play on one of a plurality of separately reproducible record tracks of the tape cassette and conditions the cassette for reproducing a successive set of record tracks. Specifically, a unique "flip-over" mechanism displaces the cassette away from the play station, inverts it and returns the cassette to the play station in a position suitable for reproducing information on a second set of independently playable record tracks.

The tape recorder of the invention also successively plays a preselected number of tape cassettes with the reserve cassettes being supported in a storage bin adjacent the play station. A "recirculating" feature is provided whereby cassettes are transferred to the play station from the bottom of the bin and returned to the same bin to allow a continuous and successive play of the cassettes disposed therein. It is also possible to preselect a desired number of cassettes to be played with the recorder being conditioned to thereafter turn off; in this regard, any number of cassettes from one to a predetermined maximum may be disposed within the storage bin so that by preselecting a desired number of cassettes to be played, one or more of such cassettes may in fact be replayed.

For added user convenience, the storage bin is removably supported within the recorder and is constructed to serve as a permanent storage vehicle for the cassettes externally of the recorder. Thus, labeled bins of related recordings may be maintained in a separate storage cabinet and conveniently selected and inserted into the recorder without the necessity of individually handling and loading each cassette. In summary, all of the described features of the tape recorder-reproducer unit of the invention contribute to provide a home entertainment center of unrivaled convenience and flexibility for the user.

Accordingly, the invention relates to a tape recorder-reproducer comprising a play station suited for individually receiving and playing tape cassettes of the type having a plurality of separately playable record tracks. More specifically, the invention is directed in one facet to the improvement comprising a bin storage means adapted for storing a plurality of cassettes in stacked relation with an unloading means being provided for removing a cassette from the play station and placing the cassette into the bin storage means. A loading means is also provided for individually removing a cassette from the storage bin and for disposing the removed cassette at the play station.

Another facet of the invention is directed to a unique "flip-over" mechanism which comprises a carrier means supporting one of the cassettes at the play station to permit reproduction of one of its separately playable record tracks. A displacement means is coupled to the carrier for displacing the carrier and the supported cassette a predetermined distance away from the play station and for returning the carrier thereto. A pivot means, effectively responsive to displacement of the carrier a predetermined minimum distance away from the play station, is provided for effecting a predetermined angular rotation of the supported cassette to position the cassette for return to the play station in an inverted orientation to permit reproduction of another of the aforesaid plurality of separately playable record tracks. Operation of the displacement means is initiated by a sensing means which is effectively responsive to the conclusion of tape play in one direction on the tape cassette.

Yet another facet of the invention is directed to an arrangement wherein a storage bin means, adapted to receive and hold a plurality of cassettes in stacked relation, is removably located in an operating position by a support means which is integral with the recorder-reproducer. Handling means are provided for removing a cassette in the bin storage means and for advancing another cassette from the bin to the play station in response to a predetermined control signal. The predetermined control signal is applied to the handling means by a first sensing means which develops the aforesaid signal in response to the completion of play of a cassette at the play station.

Another feature of the invention relates to the improvement comprising a handling means adapted for displacing a one of the cassettes from the play station to a predetermined position spaced therefrom, inverting the cassette relative to the play station and returning the cassette to the play station to permit reproduction of a successive one of the separately playable record tracks. The handling means is actuated by a first sensing means which is responsive to the conclusion of tape travel in one direction on the cassette. An unloading means for the cassette is actuated by a second sensing means responsive to reproduction of all the separately playable record tracks.

BRIEF DESCRIPTION OF THE DRAWINGS

The novel features of the present invention are set forth with particularity in the appended claims. The invention together with further objects and advantages thereof may best be understood, however, by reference to the following description taken in conjunction with accompanying drawings in the several figures of which like reference numerals identify like elements and in which:

Figure 1:
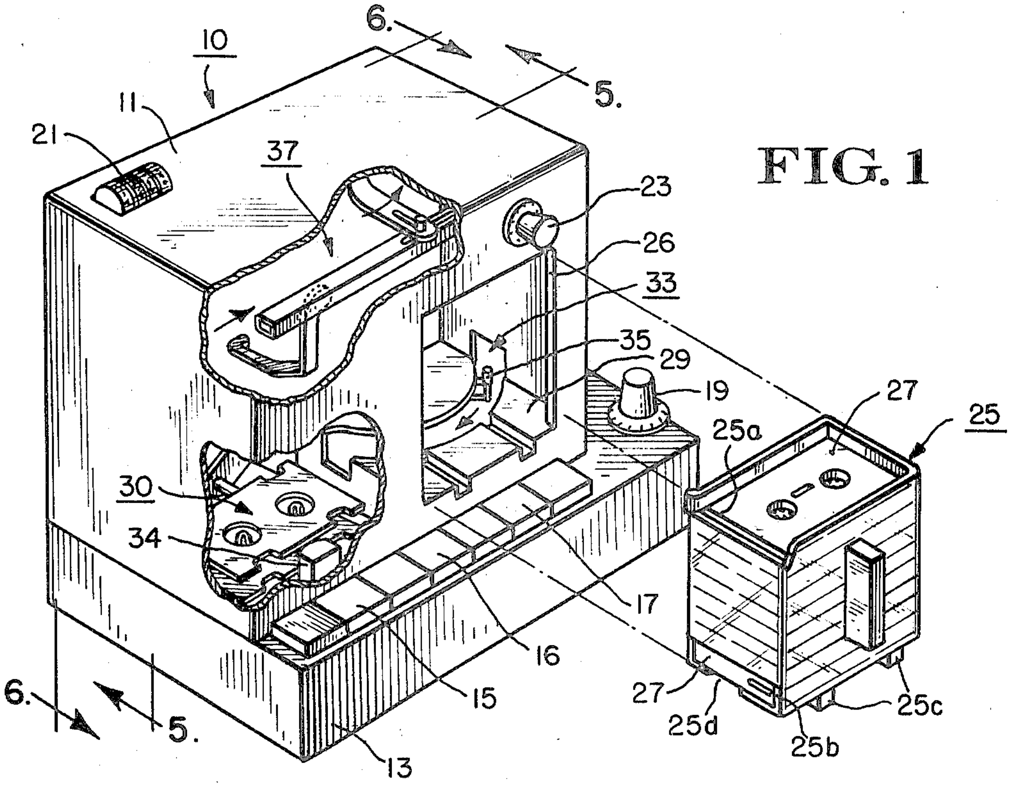
FIG. 1 is a semischematic, perspective view of a tape recorder-reproducer embodying the various features of the present invention.
Figure 5:
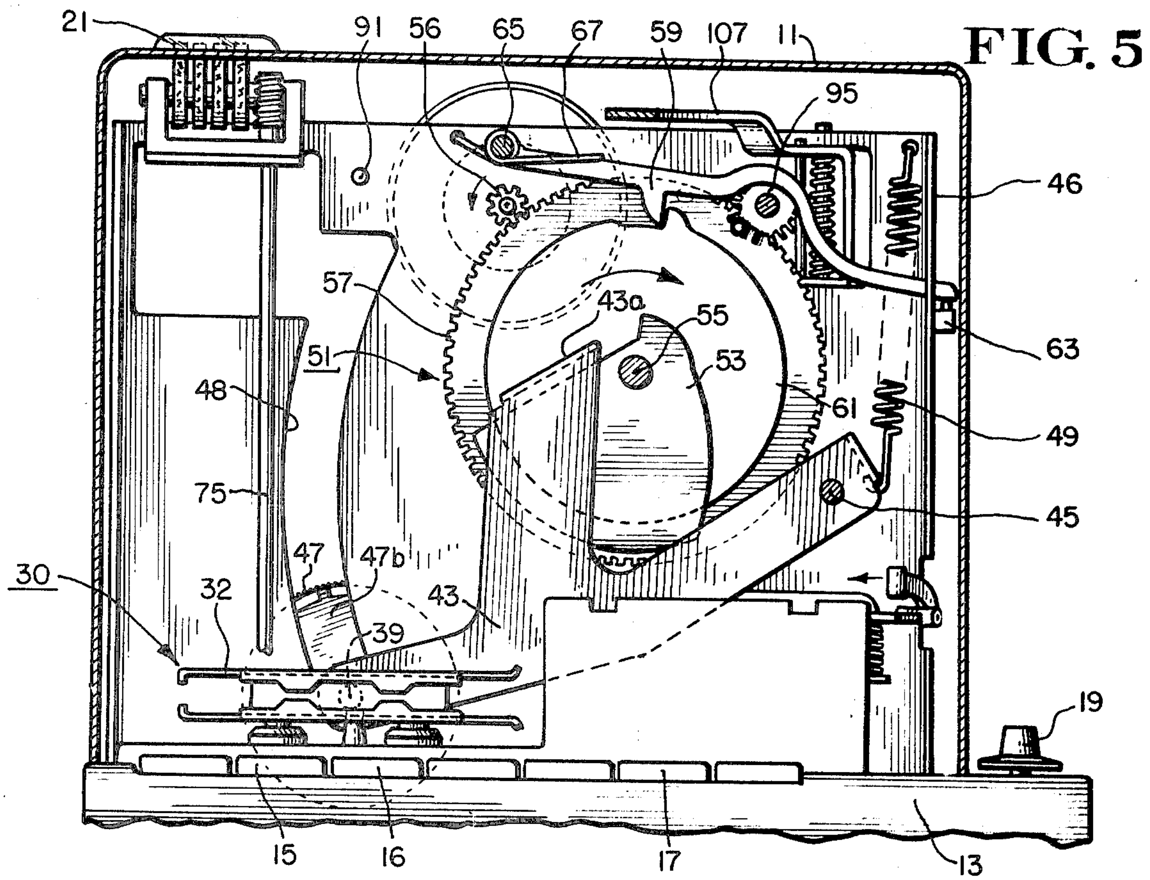
FIG. 5 is a sectional view taken along lines 5—5 of FIG. 1 and illustrating in detail a portion of the cassette handling mechanism.
Figure 6:
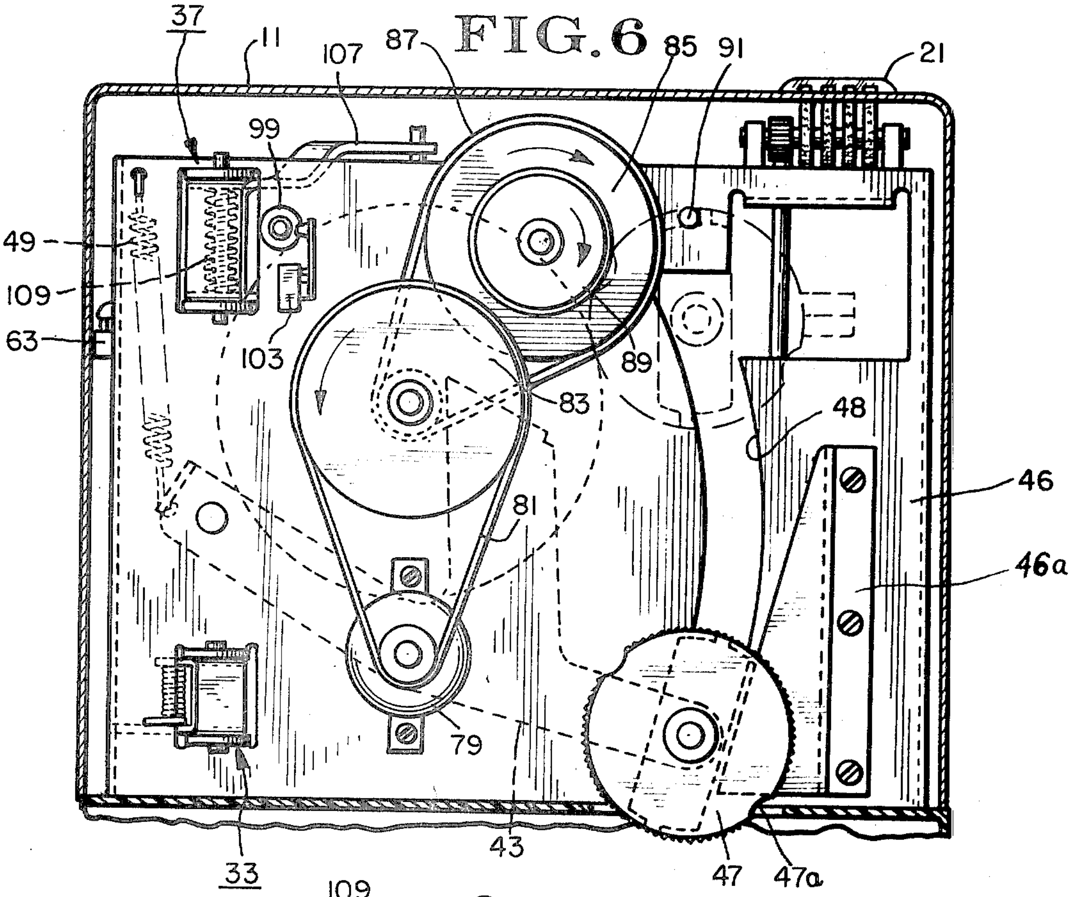
Figures 7, 8:
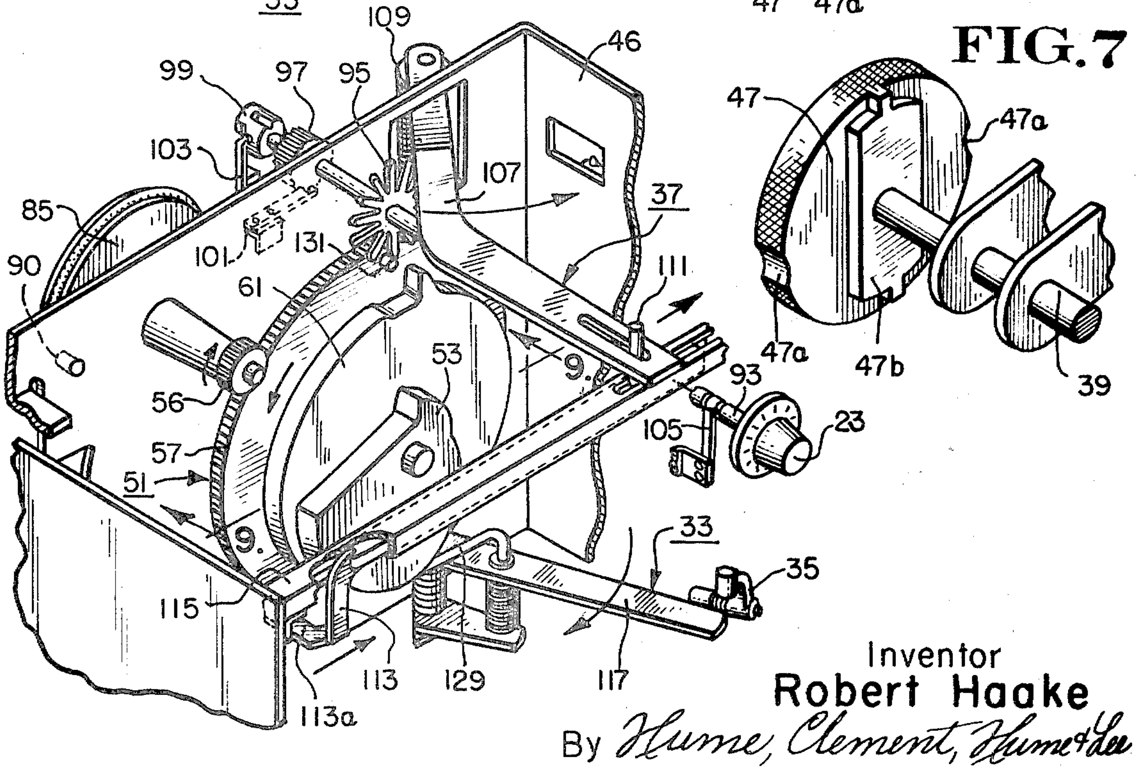
Figures 9, 10, 11:
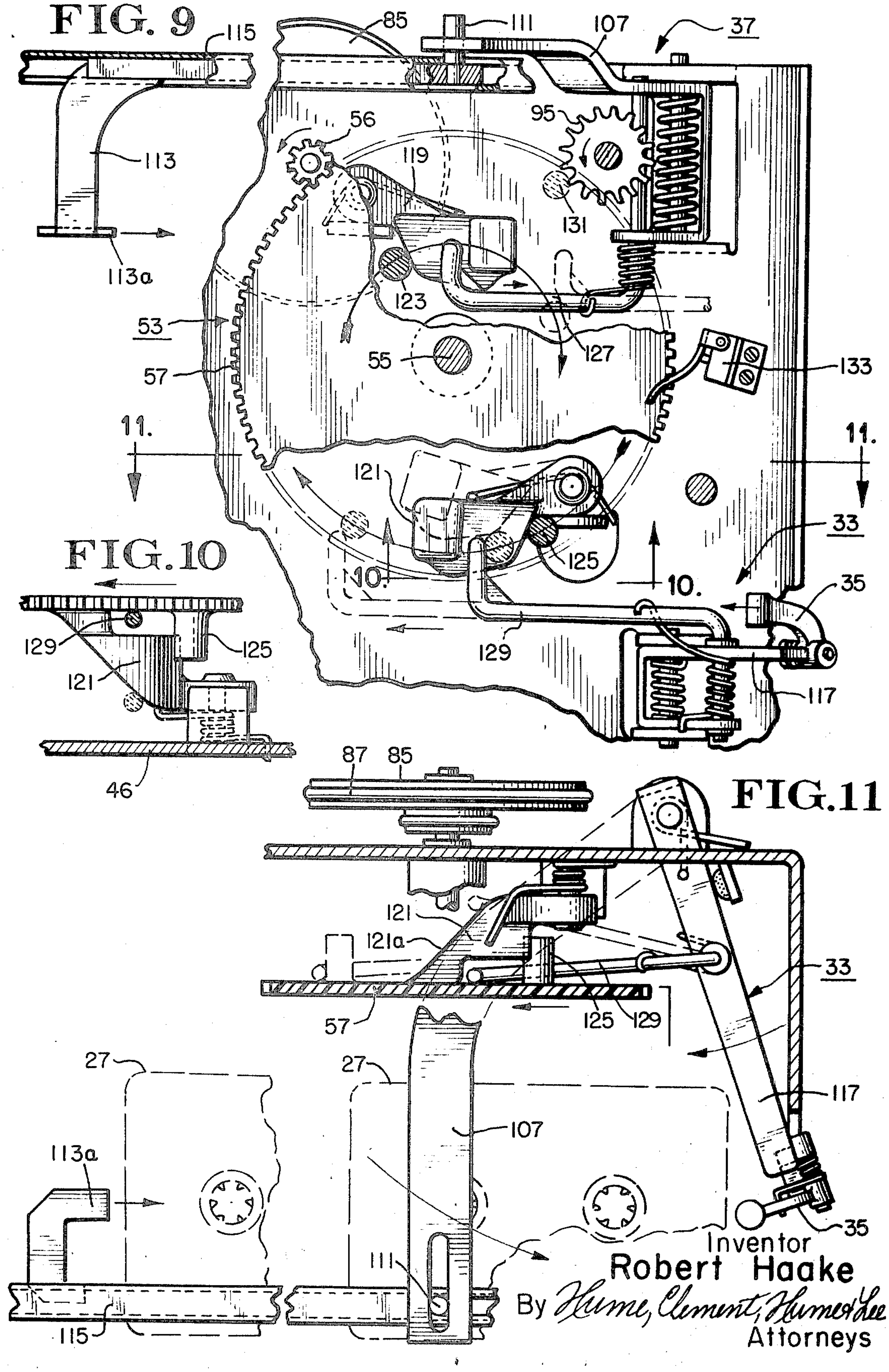

FIGS. *5a–5d* are fragmentary views generally similar to FIG. 5 but illustrate the handling apparatus in various phases of its operating cycle;

FIG. 6 is a section view taken along lines 6—6 of FIG. 1 and illustrating particularly the drive for the cassette handling mechanism;

FIG. 7 is an enlarged perspective view of a portion of the apparatus of FIG. 6;

FIG. 8 is a fragmentary perspective view illustrating yet additional portions of the apparatus of the recorder of FIG. 1 and particularly the cassette loading and unloading mechanisms;

FIG. 9 is a sectional view taken along lines 9—9 of FIG. 8;

FIG. 10 is a detail view taken along the section lines 10—10 of FIG. 9;

FIG. 11 is a sectional view taken along lines 11—11 of FIG. 10; and

Figure 12:
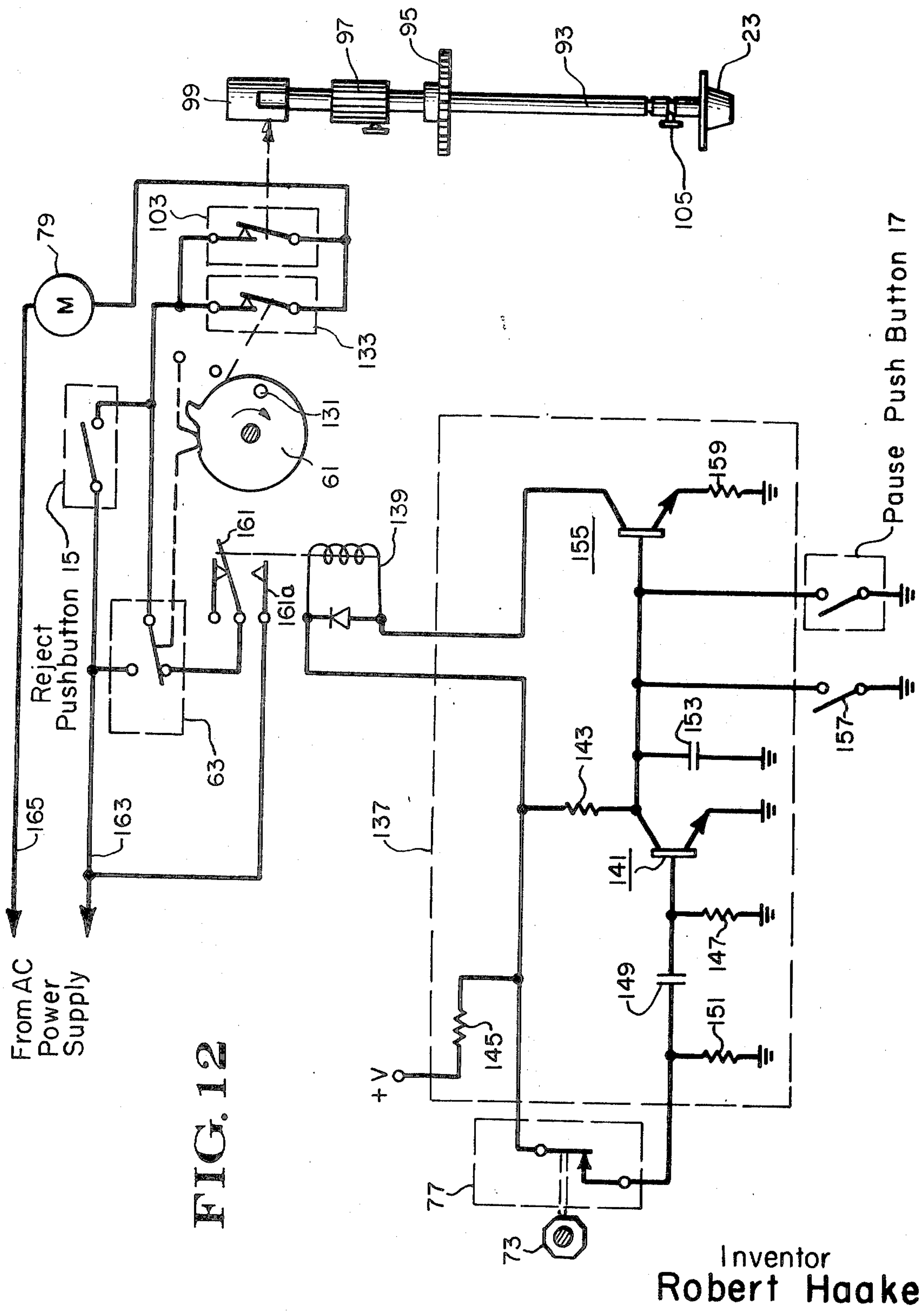

FIG. 12 is a schematic diagram of the control circuit for the recorder of FIG. 1.

DESCRIPTION OF THE PREFERRED EMBODIMENTS

Referring now to FIG. 1, the tape recorder-reproducer 10 of the invention there illustrated comprises a generally rectangular upper casing portion 11 housing the cassette handling apparatus to be described and an integral lower casing portion 13 containing the bulk of the conventional audio reproduction and control circuitry (not shown). A forward deck of the lower casing 13 is provided with a series of conventional pushbutton controls including reject, play and pause pushbutton 15–17 as well as an on-off-volume control knob 19. Additionally, a conventional footage indicator 21 is provided on the top surface of the upper casing 11 and a manually actuable selector knob 23 is provided on the forward face thereof; the selector knob 23, as will presently be explained, permits the operator to preselect the number of cassettes to be played before turnoff of the machine. It is appropriate to note at this point that the recorder 10 has been represented in a rather austere from with aesthetic details and similar structural refinements omitted for convenience and clarity of explanation.

The tape recorder-reproducer 10 is adapted to play a plurality of tape cassettes without intervention by the operator and to this end the recorder is provided with a bin storage means generally denoted by the reference numeral 25 having a plurality of tape cassettes 27 stored in a stacked relation therein. The bin 25 is of a generally rectangular boxlike configuration conforming in internal cross section to the lateral dimensions of the cassettes 27 and being of a height to accommodate a predetermined number of cassettes 27, in this instance eight cassettes. In accordance with the present invention, it is intended that the bin storage means 25 serve as a permanent storage vehicle for a number of cassettes, perhaps bearing related musical passages or the like and it is further contemplated that the user be provided with a plurality of such bins 25 adapted to be interchangeably received at an operating position within the recorder 10.

In furtherance of the foregoing objectives, it is desired that the bin 25 be of a highly economical construction and so arranged that the cassettes 27 cannot inadvertently be spilled from the bin. Specifically, the bin 25 constitutes a simple six-sided rectangular box composed of plastic or the like, the top of the box having been omitted from the drawings to facilitate viewing of the bin structure. A pair of elongated slots 25*a* and 25*b* are provided at respectively the top and bottom of one sidewall of the box 25 to accommodate individual entry and removal of the cassettes 27 therefrom It is preferred that the slots 25*a* and 25*b* be provided with suitable spring-biased doors (not shown) adapted to open and pass a cassette 27 only upon application of a predetermined force that is significantly greater than the weight of the individual cassettes. The bin 25 is also provided with an arcuate clearance slot 25*d* (FIG. 4) to afford access of a portion of a loading means into the bin in dispensing a cassette therefrom; none of the cassette-handling mechanism is supported by the bin structure 25.

The storage bin 25 is slideably inserted into an operating position within the tape recorder 10 through the rectangular aperture 26 in the forward wall of the casing portion 11 as is denoted in the drawing by the dotted lines connecting the corners of the bin 25 and the aperture 26. The bin 25 is retained in its operating position by a support means including a platform-type deck 29 having a pair of spaced guide grooves formed therein. These grooves cooperate with mating guide rails 25*c* on the underside of the bin 25 for properly locating the removable bin in its operating position. Additionally, the support deck 29 and associated structure are arranged such that a singular cassette 27 may itself be disposed on the deck 29 and accepted by the handling apparatus to be described. In this regard, it is of course understood that the aperture 26 is provided with a spring-biased door or doors (not shown) to normally close the bin support housing.

The bin 25 in its operating position is, in the present embodiment, located laterally adjacent a cassette play station designated generally by the reference numeral 30 and visible in FIG. 1 through the fragmented wall of the upper casing 11. In order to effect a transfer of the cassettes 27 from the bin 25 to the play station 30, there is provided a loading means generally designated by the numeral 33 in the drawings; only the upstanding end portion 35 of an ejector lever of the loading means 33 is visible in FIG. 1. The upstanding arm 35 of the ejector lever is normally positioned laterally to one side of the support housing for the bin 25 but is adapted to move in an arc conforming to the arcuate clearance slot in the platform 29 and in so doing to enter the confines of the bin 25 through the similar arcuate clearance slot 25*d* in the bottom thereof (FIG. 4) to eject a cassette therefrom. The cassette handling apparatus, as will presently be explained in greater detail, also includes an unloading means 37 for returning a cassette 27 to the bin 25; the unloading means 37 is also only partially visible in FIG. 1.

Figure 2:
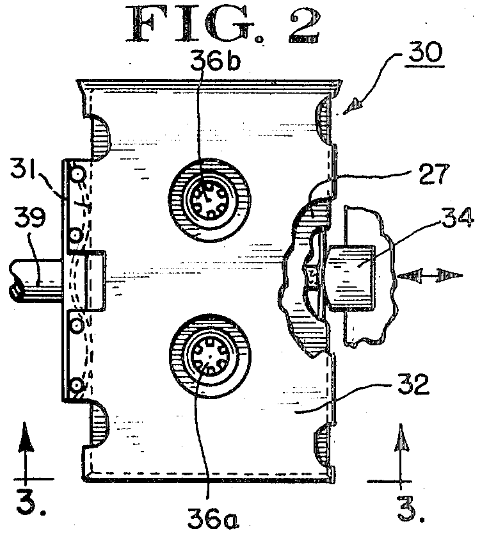
FIG. 2 is an enlarged plan view depicting the carrier and supported cassette at the play station in the recorder of FIG. 1.
Figure 3:
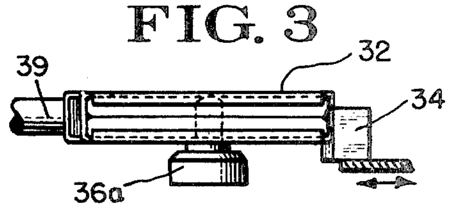
FIG. 3 is an end elevation taken along lines 4—4 of FIG. 2.

A tape cassette 27 is shown in FIGS. 2 and 3 located at the operating station 30 with a record-reproducer head 34 positioned in engagement with the tape and with spindles 36*a* and 36*b* in operative engagement with the center hubs of the supply and takeup reels of the cassette. The head 34 is adapted to retract laterally from its illustrated operating position to permit unimpeded removal of the cassette from the operating station by the handling apparatus. In this regard, it is preferred that each cassette be supported externally of the bin 25 by a carrier means 32 which serves not only to locate the cassette at the play station but also to transfer the cassette between several distinct handling positions as will be explained. More particularly, the carrier 32 is constructed to promote an ease of transfer of cassettes between the bin and the carrier as well as in the present embodiment to support a cassette at its play station. To this end, the carrier 32 is a generally U-shaped member having opposed sidewalls composed of a lightweight material and spaced a distance corresponding to the thickness of a single cassette. A cassette is slideably inserted into the carrier 32 through an open end thereof. The carrier 32 frictionally retains a cassette therewithin by means of an elongated leaf spring 31 which resiliently urges the cassette into engagement with inwardly turned flanges on the forward edges of the opposed walls of the carrier 32. The bright or backwall of the U-shaped carrier 32 is affixed to a shaft 39 which through interconnecting apparatus presently to be considered transports the carrier 32 through its operating cycle.

Figure 4:
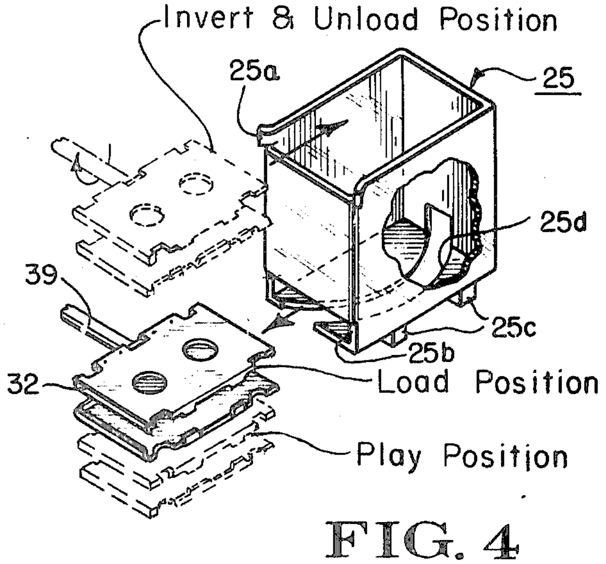
FIG. 4 is a semischematic view of a portion of the mechanism of the recorder of FIG. 1 and illustrating particularly the cassette storage bin and various positions assumed by the cassette carrier during the course of an operating cycle.

Before proceeding to a detailed structural description of the cassette handling apparatus of the invention, it is helpful to first refer to FIG. 4 which illustrates in a simplified diagrammatic form the operating sequence of the cassette handling mechanism. The carrier 32 as denoted by the solid and phantom outline representations of this member in the figure travels along a vertical path located laterally adjacent the bin 25. During the course of its travel, the carrier 32 assumes three distinct positions, namely, a load position adjacent the open lower end 25*b* of the bin, a play position at the play station 31 and an invert and unload position adjacent the open upper end 25*a* of the bin, all as denoted by appropriate labels in FIG. 4. Assuming the carrier 32 to have just entered the play position of FIG. 4, the operating sequence is as follows. A first separately playable record track or tracks of the cassette are reproduced at the play station, the tape being transferred from the supply to the takeup reel by operation of an appropriate one of the drive spindles 36 and 36*b* in conventional fashion. At the end of the tape travel in one direction, the carrier 32 is displaced by the handling and control apparatus to be considered from the play station and to move upwardly along a vertical path to a position labeled "invert and unload" in FIG. 4 whereat the carrier and supported cassette are inverted and then returned to the play position to permit reproduction of a successive separately playable record track. The cassettes 27 include only two sets of separately playable record tracks and, accordingly, upon completion of play of the second record track the cassette is unloaded and a new cassette installed at the play position. Specifically, at the end tape travel on the second record track, the carrier 32 is raised vertically to the invert and unload position whereat the carrier is inverted to restore the cassette to its original orientation and the cassette is ejected into the top of the bin through the open slot 25*a* therein. The carrier 32 is then lowered to its load position adjacent the slot 25*b* in the bin whereat it momentarily dwells while a cassette is dispensed from the bin into the cassette as denoted schematically by the arrow in the drawing.

The carrier returns to the play position and the cycle above described is repeated.

Referring now to FIG. 5, the apparatus for moving the carrier 32 through its operating cycle is illustrated in detail. Specifically, the carrier displacement means includes an elongated lever 43 pivotally mounted at one end about a shaft 45 that is journaled in a support frame 46; the lever 43 pivotally supports at its opposite end the shaft 39 which in turn is fixedly connected at one of its ends to the carrier 32. For reasons to be explained, the shaft 39 carries at its opposite end a drive wheel 47. The carrier 32 is normally biased to the operating station 30 as shown in FIG. 5 under the influence of a spring 49 connected between the end of the lever 43 adjacent the pivot post 45 and the upstanding support frame 46.

In order to displace the carrier 32 from its play station illustrated in FIG. 5 through the various stages of its operating cycle, there id provided a cam gear means generally denoted by the reference numeral 51. More specifically, the cam gear means 51 includes a cam member 53 mounted to a shaft 55 and adapted to engage an inwardly turned cam follower tab 43*a* at one end of an intermediate arm portion of the pivot lever 43. The cam member 53 is integrally formed with a main cam gear 57, the main cam gear being rotated about its center shaft 55 by a spur gear 56.

In the present embodiment, the cam gear means 51 is arranged to rotate through one complete revolution in transporting the carrier 32 through one complete operating cycle. In order to maintain the drive motor for the cam gear means operative for one complete revolution of the cam gear means 51, there is provided a hold circuit means including a cam follower lever 59, a hold circuit cam 61 and an electrical switch 63. More specifically, the lever 59 is pivotally mounted about a post 65 at one end with a hairpin spring 67 normally biasing a cam follower tine of the lever 59 into engagement with the circumferential surface of the hold circuit cam 61. The free end of the lever 59 is adapted to cooperate with an electrical switch 63 to maintain the cam gear drive motor operative for one revolution, as will be explained in greater detail later herein with reference to the control circuit of FIG. 12.

Figure 5A:
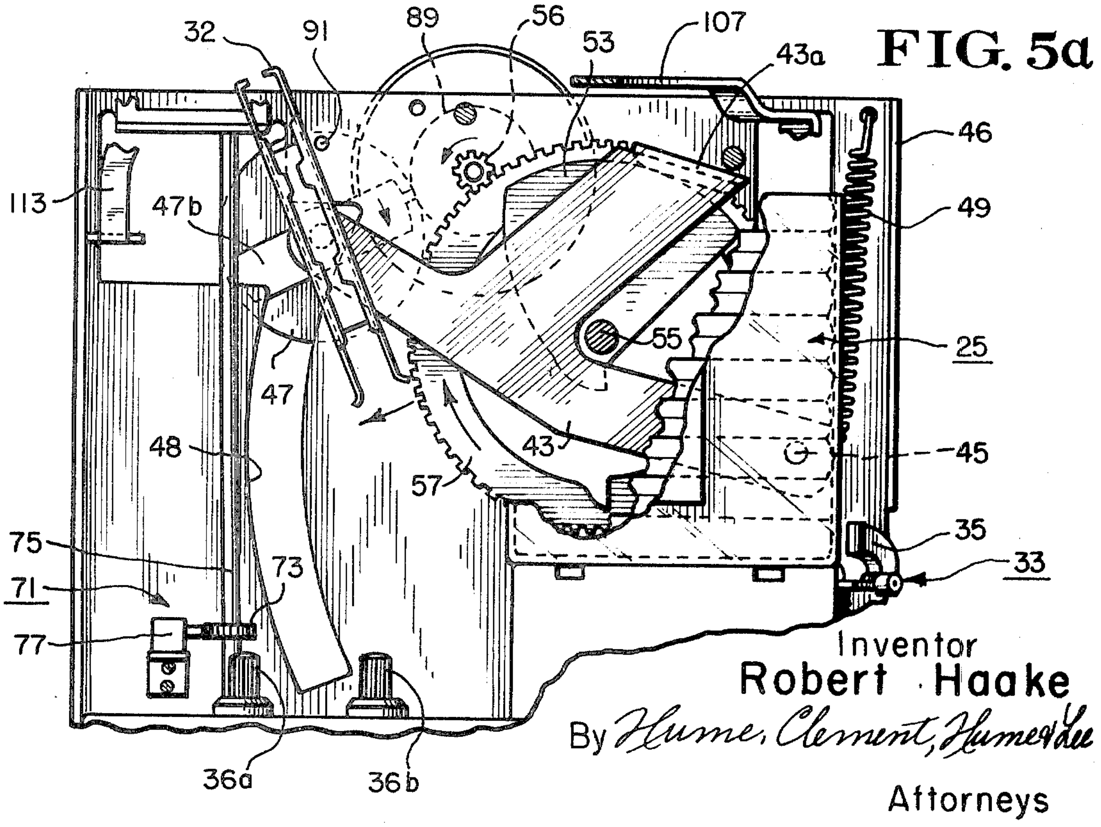
Figures 5B, 5C, 5D:
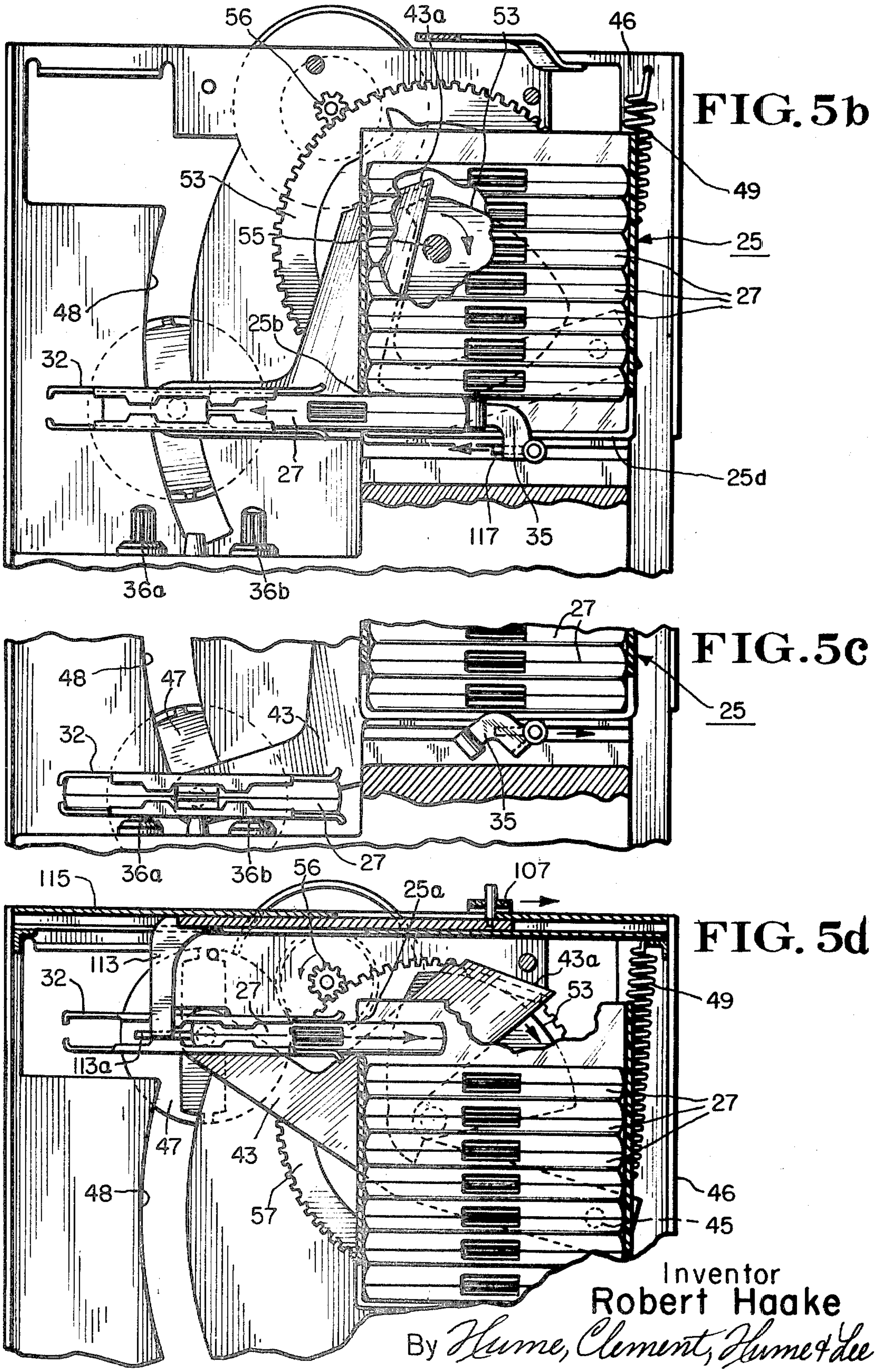

The drive motor of the cassette-handling apparatus is actuated by a first sensing means 71 (FIG. 5*a*) which is arranged to develop a predetermined control effect in response to the end of the tape travel is one direction on the cassette then at the play station. Specifically, the first sensing means 71 includes a switch actuating cam 73 mounted for rotation with a shaft 75 which is driven from one of the spindles 36*a*, and 36*b*. The shaft 75 is also connected to drive the footage indicator 21. An electrical switch 77 is positioned adjacent the cam 73 such that the contacts of the switch are opened and closed a multiplicity of times with each invert the cam 73 thereby indicating a continuing transport of the tape from the supply to the takeup reel. At the end of tape travel, the takeup spindle is stalled leaving the contacts of the switch 77 in either an open or closed position for a prolonged time period thereby developing an actuating signal for the drive motor, as again will be explained in greater detail in connection with an explanation of the control circuit of FIG. 12.

Referring now to FIG. 6, the drive mechanism for the cam gear means 51 is illustrated in detail. Specifically, a drive motor 79 of the cam gear means 51 is mounted by a support bracket on the rear side of the support frame 46. The motor 79 is connected by a drive belt 81 to a first idler pulley arrangement 83 which in turn is connected to a pulley 85 through a second drive belt 87. The pulley 85 is mounted on the same shaft as the spur gear 56 of the cam gear means 51. This shaft also carries a puck 89 which is engaged by the drive wheel 47 when the cassette carrier 32 is raised to its "invert and unload" position by the pivot arm 43. The puck 89 rotates the drive wheel 47 to invert the carrier, a stop abutment on the interior surface of the drive wheel 47 engaging a stop post 91 after the carrier has been rotated through 180°. As shown in FIG. 7, the drive wheel 47 is provided with a knurled surface to assure a secure frictional engagement between the drive wheel and the puck 89; excessive wear of the puck and drive wheel as a consequence of the slippage between these members upon engagement of the stop abutment of the drive wheel and the post 91 is precluded by providing two smoothed surface portions 47*a* at appropriately spaced positions on the circumference of the drive wheel 47. As also shown in FIG. 7, angular displacement of the drive wheel 47 is precluded prior to the carrier reaching its invert and unload position by provision of the raised abutment 47*b* on the interior surface of the drive wheel 47. The drive wheel abutment 47*b* is confined to follow a guide slot 46*a* in the support frame 46 thereby preventing rotation of the carrier 32.

Referring now to FIG. 8, a combined indicator and selector means for preselecting the number of cassettes to be played as well as visually denoting the number of cassettes remaining to be played is illustrated in detail. Specifically, the combined indicator-selector knob 23 which bears a number of indicator notations at spaced intervals about its periphery. For example, assuming that the storage bin 25 holds eight cassettes and that each cassette includes two separately reproducible record tracks, the indicator 23 is provided with the notations 1A, 1B, 2A, etc. at equally spaced intervals about its periphery thereby to denote both the cassette and the record track then being reproduced at the play station. The selector knob 23 is connected by an elongated shaft 93 to a star wheel 95, the individual cogs of which are adapted to be engaged by a lug of the main cam gear 57. The portion of the shaft 93 extending rearwardly of the star wheel 95 is journaled within the backwall of the support frame 46; the shaft 93 carries adjacent its terminal end a 16 position detent wheel 97 as well as a switch actuator cam 99. The detent member 97 is engaged by a detent arm 101 mounted to the rearward wall of the support frame 46, the detent arm being visible only in phantom outline in FIG. 8. The detent mechanism 97, 101 assures a positive indexing of the selector knob 23 at each of its 16 positions. The cam member 99 is engaged by a cam follower contact of an electrical switch 103 which is normally maintained in a closed contact position, the switch contacts, however, being opened when the illustrated circumferential groove in the member 99 is rotated into alignment with the cam follower portion of the switch 103. Opening of the contacts of switch 103 turns off the tape recorder-reproducer 10. The tape recorder 10 may be operated in a continuous cycling mode by displacing the selector knob 23 axially inward which brings the cam follower contact arm of the switch 103 into alignment with the uniformly cylindrical portion of the cam 99. The selector 23 is positively detented in each of its axially spaced operating positions by a spring-biased detent arm 105 that is adapted to engage one or the other of a pair of spaced circumferential grooves in the shaft 93.

The loading means 33 and the unloading means 37 for respectively transferring a cassette from the storage bin 25 to the carrier 32 and vice versa are also illustrated in further detail in FIG. 8. The unloading means 37 comprises an elongated lever arm 107 pivotally mounted at one end of a shaft that is journaled in a pair of struck out tabs of the support frame 46. A coil spring 109 (See also FIG. 6) normally biases the lever 107 in a clockwise direction. The lever 107 is provided with an elongated guide slot at its free end through which projects an upstanding post 111 of an injector lever 113. The injector lever 113 rides axially within a guide rail 115 that is mounted on the support frame 46. The injector lever 113 is illustrated in its quiescent position but is movable to the right in the drawings upon counterclockwise rotation of the pivot lever 37 thereby bringing the laterally extending injector tab 113*a* into engagement with a cassette positioned within the carrier at the unload station, as will presently be explained in greater detail.

The similarly constructed loading mechanism 33 comprises a pivot lever 117 which is mounted to the support frame 46 in like fashion to the pivot lever 107 of the unloading means 37. The pivot lever 117 carries at its free end the abutment member 35 which is pivotally mounted to yield to a counterclockwise force while resisting a clockwise force.

The loading and unloading mechanisms 33 and 37 are operative in a predetermined time relation to one another and the carrier 32 to effect the transfer of a cassette between the storage bin and the carrier. Additionally, the loading and unloading mechanisms are actuated only on alternate operating cycles of the carrier so that both of the separately playable sets of record tracks on the cassette are reproduced prior to unloading the cassette and installing a successive cassette at the play station. The apparatus for accomplishing the foregoing shown with particularity in FIGS. 9–11 and specifically includes a pair of similar detent members 119 and 121 pivotally mounted to the support frame 46 immediately behind the main cam gear 57 of the cam gear means 51. Each of the detent members 119 and 121 is normally biased by a respective hairpin spring inwardly towards the center axis of the cam gear 57. The detent means 119 and 121 are, however, displaceable radially outward by respective camming lugs 123 and 125 mounted in a predetermined spaced relation on the interior face of the cam gear 57. The lugs 123 and 125 are mounted at different radii such that each cooperate only with its associated detent member.

The detent members 119 and 125 normally maintain actuating levers 127 and 129 of the loading and unloading means 37 and 33, respectively, in a spaced relation to the lugs 123 and 125. However, as illustrated in conjunction with the detent member 121, the camming lug 125 is adapted to engage a cam follower surface of the detent member 121 to lift this member from the path of the spring-biased actuating arm 129 allowing the actuating arm 129 to swing inwardly against the interior face of the cam gear 57. At this juncture, however, the lug 125 has passed beyond the upstanding end portion of the actuator lever 129; the actuating lever is, however, now positioned for engagement by the lug 125 on its succeeding revolution, as is shown by the dotted and solid representations of the arm and lug in FIG. 11. Engagement of the actuating arm 129 by the lug 125 pivots the lever 117 of the loading means in a clockwise direction to eject a cartridge 27 from the bin. On continued rotation of the cam gear 57, the lug 125 moves up and away from the actuating arm 129 thereby releasing the actuating arm and allowing the pivot lever 117 to return to its original rest position under the influence of its bias spring. On return movement of the pivot lever 117, the actuating arm 129 is cammed outwardly along the inclined surface 121a of the detent member 121 to return to its original position. The detent means 119 for the unloading mechanism 37 and the associated cam lug 123 and actuating arm 127 operate in identical fashion to their counterparts in the loading mechanism above described and, accordingly, will not be considered in further detail.

Also visible in FIG. 9 is a lug 131 mounted at the outer periphery of the cam gear 57 for engaging the cogs of the star wheel 95 to increment the star wheel and indicator one unit for each complete revolution of the cam gear. The lug 131 switch engages on each revolution a contact arm of a shutoff switch 133; the switch 133 is normally shunted by the closed contacts of the switch 103 (FIG. 8).

The control circuit for the tape recorder of the present invention is illustrated in FIG. 11. Specifically, as earlier explained, the cam member 73 continuously rotates during travel of the tape from one reel to the other causing the switch 77 to opened and closed a multiplicity of times for each revolution of the cam 73. A sensing circuit shown within the dashed block 137 is responsive to the switch 77 being in either an open or closed position beyond a predetermined time interval, in this instance 2 seconds, for providing an energizing signal for a relay coil 139. More particularly, the sensing circuit 137 includes conventional NPN transistor 141 connected in a grounded emitter configuration with its collector coupled through series load resistors 143 and 145 to a positive operating supply. The base of the transistor 141 is coupled to ground by a resistor 147 and the parallel combination of a charging capacitor 149 and a resistor 151. The juncture of the elements 149, 151 is connected through the contacts of switch 77 and the resistor 145 to the positive operating supply.

The collector-emitter circuit of the transistor 141 is connected as a bypass to a charging capacitor 153. The positive side of the capacitor 153 is connected to the base of a second NPN transistor 155 which has its collector-emitter circuit coupled from one end of the relay coil 139 to ground. A pair of normally open switches including the pause pushbutton 17 and a switch 157 are coupled to the base of the transistor 155 to selectively ground the input to this transistor thus effectively inhibiting operation of the sensing circuit. The pause pushbutton permits one to momentarily interrupt the record-reproduce operation at any time without rejecting the cassette being played. The switch 157 assures that whenever the record-reproduce head 34 is away from tape, as occurs in the stop position, that the cassette being played will not be rejected.

In operation, the capacitor 149 of the sensing circuit 137 is periodically charged and discharged by closing and opening of the contacts of the switch 77 to thereby result in a continuing sequence of time-spaced pulses being applied to the base of the transistor 141 to render this transistor operative and inoperative in corresponding time intervals. Specifically, the capacitor 149 is charged through a circuit path extending from the positive bias supply through the resistor 145, the closed contacts of the switch 77, the capacitor 149 and the resistor 147 to ground. Upon opening of the contact 77, the capacitor 149 discharges through the resistor 151 conditioning it to accept another charge on the subsequent closure of the switch 77.

By the above mode of operation, the transistor 141 serves to periodically shunt the capacitor 153 to ground, the capacitor 153 being charged on intervening intervals from the positive bias supply through the series resistors 145 and 143. At the normal actuating rate of the switch contact 77, the capacitor 153 is never charged sufficiently to bias the transistor 155 to an on condition. However, if the cam 73 ceases rotation, the capacitor 153 is no longer periodically shunted to ground and a charge builds up thereon of sufficient magnitude to actuate the transistor 155 and energize the relay coil 139 through the series path extending from the positive bias supply through the resistor 145, the coil 139, the conductive transistor 155 and its emitter resistor 159 to ground.

Energization of the relay coil 139 in turn energizes the motor 79 by completing an electrical circuit between an AC power supply (not shown) and the motor 79. Specially, energization of the coil 139 displaces the movable armature 161 from its inoperative position illustrated in the drawing to a position in engagement with the contact 161a thereby completing an electrical circuit from a power supply lead 163 through the contact 161, 161a, the switch 63, the motor 79, and a second power supply lead 165. Rotation of the drive motor 79 rotates the cam gear 61 causing the switch-actuating lever 59 to be cammed out of the depression of the cam member 61 thereby displacing the movable armature of the switch 63 from its illustrated position to the adjacent contact position which provides a direct connection to the power supply lead 163. This hold circuit bypasses the relay contacts 161, 161a to maintain the motor 79 energized for a complete revolution of the cam 61, the motor 79 being deenergized as the depression in the cam 61 returns to its position illustrated in FIGS. 5 (Pictorial) and 12 (Schematic) One or more cassettes may be bypassed without playing of their record tracks by depressing the reject button 15 which momentarily energizes the motor 79 until the hold circuit above-described is actuated.

As previously explained, the tape recorder-reproducer of the present invention is adapted to automatically turn off after a preselected number of cassettes have been played. In this regard, the desired number of cassettes to be played is selected by rotating the selector switch 23 to the appropriate position. On each revolution of the cam gear means 53, the star wheel 95 is incremented one unit thereby rotating the depression of the cam 99 into registry with the cam follower contact arm of the switch 103 after the desired number of cassettes have been played. This opens the circuit for the motor 79 to preclude play of further cassettes. In order to assure that the cam gear means is stopped in an appropriate angular orientation, the shut off switch 103 is bypassed by a parallel switch 133 which is actuated by a lug 131 carried on the cam 61. Thus, the motor 79 is deenergized only when the lug 131 rotates to deenergize the switch 133. Although the switch 133 is opened on each revolution of the cam 61, it will be recognized that the switch 103 acts in these prior instances as a parallel bypass to maintain the motor 79 in condition for operation.

The tape recorder-reproducer of the invention is also adapted for operation in a continuous cycling mode resulting in the cassettes being recirculated in continuous and sequential fashion from the play station to the storage bin. In order to condition the recorder for operation in this mode, the shaft 93 is axially displaced to bring the uniformly cylindrical surface portion of the cam 99 into engagement with the cam follower contact arm of the switch 103; accordingly, the switch 103 is never open and operation of the mechanism will continue until the recorder is manually shut off.

Returning now to FIGS. 5 and *5a–5d*, the overall operation of the tape recorder-reproducer of the invention will briefly be summarized. The carrier 32 is shown in FIG. 5 at the play station 30 in an empty condition. In order to commence operation of the unit, the user depresses the reject button to energize the drive motor and commence rotation of the cam gear mechanism 51 through the drive gear 56. The resultant clockwise rotation of the cam member 53 lifts the pivot lever 43 against the bias of the spring 49, the cam follower tab *43a* of the lever 43 continuing to ride along the straight surface portion of the cam 53 until the pivot lever 43 is raised to its upwardmost position at which time the cam follower tab *43a* moves onto the intersecting constant radius portion of the cam 53. It will be recalled that in moving from its play station to its invert or unload position the carrier 32 is precluded from angular displacement by the abutment *47b* which protrudes into alignment with the guide *46a*.

The carrier 32 is shown in its invert and unload position in FIG. *5a* the cam follower tab *43a* of the pivot lever 43 now riding along a first constant radius portion of the cam 53 to maintain the drive wheel 47 in firm engagement with the puck 89. The carrier 32 continues to rotate until a terminal portion of the abutment *47b* engages the stop post 91 at which time the carrier is positioned laterally adjacent the unload station and in a horizontal attitude. The carrier momentarily dwells in this position until the cam gear 53 rotates sufficiently to present the succeeding cam follower surface to the tab *43a*. The contour of this cam surface portion permits the pivot lever 43 to rotate downwardly under the influence of its bias spring 49 to the load position illustrated in FIG. *5b*. The load lever 117 is then actuated in the manner earlier described to rotate the lever arm 35 into the arcuately slotted base of the bin 25 to slideably eject a cartridge therefrom as illustrated in FIG. *5b*. During this time period, the cam follower tab *43a* is moving along the final constant radius portion of the cam member 53 causing the carrier 32 to momentary dwell at its load station.

Referring next to FIG. *5c*, the pivot lever 117 is returning to is inoperative position as denoted schematically by the arrow and the carrier 32 has moved to its play station as the cam follower tab *43a* drops off the sharply sloped portion of the cam member 53. The cassette 27 at the play station is now in condition for reproduction of one of its separately playable record tracks. After reproduction of the first record track, the handling apparatus is again actuated by the control circuit previously described, the cassette is inverted and returned to the play station for reproduction of the second and remaining record track. The unload operation following play of the second record track is illustrated in FIG. *5d*. Specifically, the carrier 32 is positioned to momentarily dwell at the unload station while the arm 113 is actuated to eject the cartridge into the storage bin.

While particular embodiments of the present invention have been shown and described, it is apparent that various changes and modifications may be made, and it is therefore intended in the following claims to cover all such modifications and changes as may fall within the true spirit and scope of this invention.

I claim:

1. In a tape recorder-reproducer or the like having a play station suited for individually receiving and playing tape cassettes, having first and second magnetic tracks, said second magnetic track being recorded in a direction opposite from said first magnetic track and further having an aperture perpendicular to its transverse axis to permit reproduction of the said record tracks, the improvement comprising:

bin storage means adapted for storing a plurality of the cassettes;

loading means for removing one of the cassettes from said bin storage means and for disposing the cassette at the play station for playing one of the magnetic tracks;

inverting means located between said bin storage means and the play station and operable to invert the cassette about said transverse axis when in said location to position the cassette for return to the play station for playing the second magnetic track through said aperture; and unloading means for removing the cassette from the play station and for placing the cassette in said bin storage means.

2. In a tape recorder-reproducer or the like including a play station suited for individually receiving and playing tape cassettes of the type having a plurality of separately playable record tracks, at least one of said record tracks being recorded in a direction opposite from a second of said record tracks and further having an aperture perpendicular to its transverse axis to permit reproduction of said tracks; the improvement comprising:

storage means adapted for storing a plurality of said cassettes;

carrier means for supporting one of said cassettes and moving said cassette into said play station so as to permit reproduction of one of said separately playable record tracks;

loading means for individually removing a cassette from said storage means and for placing said cassette in said carrier means;

unloading means for removing said cassette from said carrier means and for placing said cassette into said storage means; and pivot means for effecting a predetermined angular rotation of said carrier means whereby said cassette is rotated about said transverse axis to position said one cassette in an inverted orientation to permit reproduction of another of said plurality of separately playable record tracks through said aperture.

3. The improvement of claim 2 further comprising first sensing means effectively responsive to the conclusion of tape play of said first record track for initiating operation of said pivot means.

4. The improvement of claim 3 wherein said unloading means is effective to unload said one cassette only after said pivot means has effected play of said plurality of record tracks thereon.

5. The improvement of claim 2 wherein said storage means comprises a bin and wherein said tape recorder-reproducer further comprises a support means for supporting said bin in operating position and for permitting removal of said bin from said tape recorder-reproducer.

6. The improvement of claim 4 and further including first control means coupled to said loading means, said unloading means, and said carrier means for operating said loading and unloading means in a predetermined time sequence.

7. The improvement of claim 6 in which said first control means includes a motor and a cam gear driven by said motor, said cam gear having cam surfaces adapted for successively actuating said unloading and loading means to effect a return of one cassette to said storage means and placement of a successive cassette at said play station.

8. The improvement of claim 7 in which said loading means includes an ejector mechanism adapted to extend into said storage means for displacing one said said cassettes out of said storage means for transfer to said play station.

9. The improvement of claim 8 in which said unloading means includes an injector mechanism for effecting transfer of said cassette from said carrier into said storage means.

10. The improvement of claim 9 and further including indicator means adapted to be incremented by said cam gear means for visually denoting which of said cartridges is in said play position.

11. The improvement of claim 9 wherein said storage means comprises a bin, said bin including a spaced first and second end portions nd wherein said ejector and injector mechanisms are located adjacent a respective one of said first and second end portion.

12. The improvement of claim 11 in which said ejector and injector mechanisms each comprise a pivotally mounted lever having an integral actuator arm and in which said cam gear means includes a pair of lugs mounted on said cam gear means for rotation therewith and each adapted to engage a respective one of said actuator arms.

13. The improvement of claim 11 in which said bin storage means is removably received within said tape recorder-reproducer and further in which said tape recorder-reproducer is constructed and arranged to receive a single one of said cassettes in the absence of said bin storage means.

14. The improvement of claim 13 wherein said carrier means is adapted for travel along a path adjacent said bin storage means between positions respectively adjacent said first and second ends of said bin storage means, said first control means being adapted to operate said carrier means in a predetermined time sequence with said loading and unloading means.

15. The improvement of claim 14 in which said carrier means is adapted to momentarily dwell at said positions adjacent said first and second ends of said bin storage means for respectively permitting said injector mechanism of said unloading means to displace said cassette from said carrier means into said bin storage means and for permitting said ejector mechanism of said loading means to transfer a cassette from said bin storage means to said carrier means.

16. The improvement of claim 5 in which said bin storage means includes a first end for receiving cassettes and a second end constructed and arranged for individually dispensing cassettes.

17. The improvement of claim 16 in which said bin storage means consists essentially of a single rectangular box conforming in cross section to the lateral dimensions of said cassettes for serving as a permanent storage vehicle for said cassettes and having predetermined apertures formed therein for permitting access of said handling means within the confines of said box.

18. The improvement of claim 4 and including second sensing means responsive to completion of play of a preselected number of said cassettes for turning off said tape recorder-reproducer.

19. The improvement of claim 18 and including selector means, coupled to said second sensing means, including a manually actuable selector knob for selecting the number of cassettes to be played before turnoff of said tape recorder-reproducer by said sensing means.

20. The improvement of claim 17 in which said loading means includes a pivotally supported ejector lever having an upstanding arm at its free end and in which said rectangular box of said bin storage means includes an arcuate slot in its bottom surface and a slotted sidewall permitting access of said upstanding arm into said box for laterally removing a cassette therefrom.

21. The improvement of claim 20 in which said rectangular box of said bin storage means includes index means for locating said box in said operating position.

22. In a tape recorder-reproducer or the like comprising a play station suited for individually receiving and playing tape cassettes of the type having a plurality of separately playable record tracks, at least one of said record tracks being recorded in a direction opposite from a second of said record tracks and further having an aperture perpendicular to its transverse axis to permit reproduction of said recoding tracks, the improvement comprising:

carrier means for supporting one of said cassettes at said play station to permit reproduction of one of said separately playable record tracks;

displacement means coupled to said carrier means for displacing said carrier means a predetermined distance away from said play station and for returning said carrier means thereto;

pivot means, effectively responsive to displacement of said carrier means a predetermined minimum distance away from said play station, for effecting a predetermined angular rotation of said one cassette about said transverse axis to position said one cassette from return to said play station in an inverted orientation to permit reproduction of another of said plurality of separately playable record tracks through said aperture;

and sensing means effectively responsive to the conclusion of tape play in one direction for initiating operation of said displacement means.

23. The improvement of claim 22 in which said carrier means comprises a generally U-shaped member adapted to slidably receive and releasably retain one of said cassettes in sandwiched relationship between the opposed surfaces of said U-shaped member.

24. The improvement of claim 23 in which said opposed surfaces of said carrier means are each provided with inwardly facing flanges at their open ends and in which said U-shaped member includes a leaf spring mounted adjacent the bight of said U for resiliently biasing a cassette into engagement with said inwardly facing flanges to frictionally retain said cassette within said U-shaped member of said carrier means.

25. The improvement of claim 23 in which said carrier means is pivotally supported by said displacement means.

26. The improvement of claim 25 and further including interlock means for precluding angular displacement of said carrier means unless said carrier means is disposed at least said predetermined minimum distance away from said play station.

27. The improvement of claim 26 and further including locating means for centering said one cassette relative to said play station upon return of carrier means to said play station.

28. The improvement of claim 27 and further including motor means and cam gear means driven by said motor means and in which said displacement means includes a cam follower surface and further in which said cam gear means engages said cam follower surface for operating said displacement means in response to actuation of said motor means.

29. The improvement of claim 28 in which said sensing means is effective to actuate said motor means.

30. The improvement of claim 29 in which said displacement means comprises an elongated lever arm pivotally mounted at one end and having said carrier means mounted at an opposite end.

31. The improvement of claim 30 in which said carrier means is pivotally mounted on a common shaft with a drive wheel, said drive wheel having a stop abutment positioned on one of the opposed faces of said wheel and in which said pivot means includes a stop post and a puck driven by said motor means and adapted to frictionally engage and rotate said drive wheel through 180° with said stop abutment and said stop post thereafter engaging one another to preclude further rotation of said carrier means.

32. The improvement of claim 31 in which the circumferential surface of said drive wheel is knurled to assure a secure frictional engagement with said puck, said drive wheel having a pair of smooth circumferential surface portions angularly spaced one from the other by 180° and positioned on said circumference so as to engage said puck upon engagement of said stop post and said stop abutment thereby to avoid excessive wear to said drive wheel and said puck.

33. The improvement of claim 29 and further including hold circuit means comprising an actuator cam mounted for rotation with said cam gear means and an electrical switch having a contact arm operated by said actuator cam for maintaining said motor means operative for one revolution of said actuator cam thereby to operate said displacement means through one complete cycle.

34. The improvement of claim 27 and further including bin storage means for storing a plurality of said cassettes in stacked relation and further including loading means for individually transferring said cassettes from said bin storage means to said carrier means and unloading means for transferring a cassette from said carrier means to said bin storage.

35. The improvement of claim 34 in which said bin storage means is positioned laterally adjacent said play station and in which said displacement means is adapted to lift said carrier means away from said play station to a position adjacent the top of said bin storage means.

36. The improvement of claim 34 in which said cam gear means is adapted for operating said loading and unloading means in a predetermined time relation.

37. The improvement of claim 36 in which said carrier means is adapted to momentarily dwell during the course of its movement cycle at positions laterally adjacent the top and bottom of said bin storage means for permitting said unloading and loading means to transfer cassettes respectively to and from said storage bin means.

38. The improvement of claim 36 in which said cam gear means rotates one complete revolution to effect a complete operating cycle of said displacement means and in which said cam gear means is effective to operate said loading and unloading mechanisms only on alternate revolutions.

39. The improvement of claim 38 in which said loading and unloading means each include an actuating member and further in which said cam gear means includes a pair of actuating lugs mounted for rotation therewith with said actuating lugs being adapted to engage respective ones of said actuating members of said loading and unloading means.

40. The improvement of claim 39 in which each of said actuating members is normally biased toward engagement with an associated actuating lug and further including a pair of detent means for normally maintaining associated ones of said actuating members in respective first positions spaced from said lugs, said detent means each being adapted to be engaged by an associated one of said lugs for releasing said actuating members so as to permit engagement of said actuating members by said lugs on the next revolution of said cam gear means and for returning said actuating members to said respective first positions on yet a succeeding revolution of said cam gear means.

41. In a tape recorder-reproducer or the like comprising a fixedly positioned play station suited for individually receiving and playing tape cassettes of the type having a plurality of separately playable record tracks, at least one of said record tracks being recorded in a direction opposite from a second of said reversed tracks and further having an aperture perpendicular to its transverse axis to permit reproduction of said record tracks, the improvement comprising:

handling means adapted for displacing a one of said cassettes from said play station to a predetermined position spaced therefrom, inverting said cassette about said transverse axis and returning said cassette to said play station to permit reproduction of a successive one of said separately playable record tracks through said aperture;

first sensing means responsive to the conclusion of tape travel in one direction on said one cassette for actuating said handling means;

unloading means for removing said cassette from said play station;

and second sensing means responsive to reproduction of all of said separately playable record tracks for actuating said unloading means.

42. The improvement of claim 41 in which said handling means includes a motor actuated by said sensing means, cam gear means driven by said motor and a hold circuit coupled to said cam gear means for maintaining said motor operative for a predetermined angular displacement of said cam gear means.

43. The improvement of claim 42 in which said handling means includes a generally U-shaped carrier means adapted for slidably receiving and releasably retaining one of said cassettes in sandwiched relation between the opposed surfaces of said U-shaped member.

44. The improvement of claim 43 and further including loading means for transferring a cassette into said carrier means.

45. The improvement of claim 44 in which said loading and unloading means are operated by said cam gear means in a predetermined time relation to operation of said handling means.

46. In a tape recorder-reproducer or the like including a play station suited for individually receiving and playing tape cassettes of the type having a plurality of separately playable record tracks, at least one of said record tracks being recorded in a direction opposite from a second of said record tracks, the improvement comprising:

storage means adapted for storing a plurality of said cassettes;

carrier means for supporting one of said cassettes in a predetermined plane at the record play station;

loading means for individually removing a cassette from said storage means and for placing said cassette in said means; and unloading means for removing said cassette into said storage carrier means and for placing cassette into said storage means; and displacement means coupled to said carrier means for displacing said carrier means to a second plane substantially parallel to said first plane for inserting and removing said cassettes; and pivot means coupled to said carrier means for effecting a predetermined angular rotation of said carrier means about an axis in said second parallel plane to position the cassette in an inverted position to permit reproduction of another of said plurality of separately playable record tracks.

UNITED STATES PATENT OFFICE
CERTIFICATE OF CORRECTION

Patent No. 3,603,597 Dated September 7, 1971

Inventor(s) Robert Haake

It is certified that error appears in the above-identified patent and that said Letters Patent are hereby corrected as shown below:

Column 3, line 10 after " austere ", " from " should be --form--.

Column 4, line 33, " bright " should be --bight--.

Column 5, line 17 " id`" should be --is--.

Column 5, line 50, "invert" should read -- revolution of --.

Column 7, line 61, before "opened and closed" insert -- be --.

Signed and sealed this 27th day of March 1973.

(SEAL)
Attest:

EDWARD M.FLETCHER,JR.
Attesting Officer

ROBERT GOTTSCHALK
Commissioner of Patents